Patented Oct. 25, 1938

2,134,446

UNITED STATES PATENT OFFICE 2,134,446

HYDROXY-SULPHONIC ACIDS

Walter Kern, Sissach, Switzerland, assignor to the firm Society of Chemical Industry in Basle, Basel, Switzerland No Drawing. Application November 30, 1936, Serial No. 113,527. In Switzerland December 31, 1935

4 Claims. (Cl. 260—512)

This invention is based on the observation that hydroxy-sulphonic acids of hydrocarbons of high molecular weight may be made by treating with a sulphonating agent, preferably in the presence of an organic solvent or suspension medium, an hydroxy-compound of an angularly fused tetranuclear hydrocarbon which in addition to hexacarbon rings contains at most one penta-carbon ring and is free from methylene groups; alternatively amino-sulphonic acids of such hydrocarbons may be treated in acid media to obtain the same hydroxy-sulphonic acids.

Among the hydroxy-compounds of angularly fused tetra-nuclear hydrocarbons which besides hexa-carbon rings contain at most one penta-carbon ring and are free from methylene groups may be cited the hydroxy-compounds of pyrene, chrysene and fluoranthene.

The treatment of these hydrocarbons with sulphonating agents, for instance with sulphuric acid, chloro-sulphonic acid or pyridine sulphotrioxide, may occur with advantage in the presence of an organic solvent or suspension medium, for instance nitro-benzene, chloroform or trichlorobenzene. According to the proportion of the sulphonating agent used and the kind of that agent as well as the duration of the operation and the temperature thereof hydroxy-monosulphonic acids or higher sulphonation products may be obtained.

The hydroxy-sulphonic acids of the hydrocarbons of high molecular weight may also be produced by heating an amino-sulphonic acid of the hydrocarbon in an acid medium, for instance by heating it with hydrochloric acid or dilute sulphuric acid; in this case the amino-group is exchanged for the hydroxyl-group.

The hydroxy-sulphonic acids made by this invention are more or less soluble in water in accordance with the degree of sulphonation. They are valuable parent materials for the manufacture of dyestuffs and pharmaceutical products.

The following examples illustrate the invention, the parts being by weight.

Example 1

65.4 parts of 3-hydroxypyrene are introduced into 720 parts of nitrobenzene and in the course of ¾ hour at 8–10° C. 36 parts of chloro-sulphonic acid are dropped into the mixture whilst stirring. For completing the reaction the temperature of 8–10° C. is maintained for 3 hours and then the whole is heated to 18–21° C. and stirred overnight. The mass is filtered and the residue freed from the last traces of nitrobenzene by distillation in steam. The aqueous solution of the 3-hydroxypyrene-mono-sulphonic acid thus obtained of the formula

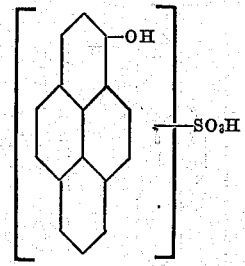

is mixed with animal charcoal, boiled and filtered. By salting out with potassium chloride there is obtained in good yield a potassium salt of a 3-hydroxypyrene-mono-sulphonic acid in the form of colorless, lustrous crystals. By fusion with caustic alkali this sulphonic acid is converted into a dihydroxypyrene which is easily oxidized and forms with an aqueous solution of potassium ferricyanide pyrene quinone.

Example 2

10.9 parts of 3-hydroxypyrene are mixed with 120 parts of nitrobenzene and whilst stirring at a temperature of 8–10 C. 5.2 parts of sulphuric acid mono-hydrate are added in the course of ½ hour. For completing the reaction the temperature is kept at 8–10° C. for 4 hours whilst stirring and then at 18–22° C. overnight. The mixture is mixed with water and ice and the nitrobenzene is distilled in steam. The aqueous solution of the 3-hydroxypyrene-sulphonic acid which contains some unaltered hydroxypyrene and some impurities is purified with animal charcoal and the potassium-3-hydroxypyrene sulphonate is separated. It is doubtless identical with the potassium-3-hydroxypyrene sulphonate obtained as described in Example 1.

Example 3

Into 45 parts of pyridine are dropped whilst cooling well and as quickly as possible at 20–30° C. 8.6 parts of chloro-sulphonic acid and then the excess of pyridine is distilled in a vacuum at 80–90° C. This sulphonation mixture is mixed with 10.9 parts of 3-hydroxypyrene and kept whilst stirring for 16 hours at a temperature of 135–140° C. The mass is now mixed with water, made alkaline to phenolphthalein and distilled in steam to remove the pyridine, whereby a solution is formed with the exception of a little impurity which is removed by filtration.

For separating the hydroxypyrene-sulphonic acid and the unattacked hydroxypyrene the solution is made acid to Congo, boiled, filtered and from the filtrate the hydroxypyrene-mono-sulphonic acid is salted out in the form of potassium salt by potassium chloride. It is doubtless identical with the potassium-3-hydroxypyrene-sulphonate made as described in Examples 1 and 2.

When using 4-hydroxypyrene as starting material, a 4-hydroxypyrene-mono-sulphonic acid is obtained by the same method of working.

Example 4

43.6 parts of 3-hydroxypyrene are dissolved in 480 parts of nitrobenzene; into the solution are dropped in the course of ½ hour at 8–10° C. and whilst stirring 48 parts of chloro-sulphonic acid. Stirring is continued for 2 hours at the same temperature and then for 2 hours at 20–25° C. Finally for completing the reaction the temperature is kept for 2 hours at 50–60° C. The 3-hydroxy-pyrene-disulphonic acid thus produced of the formula

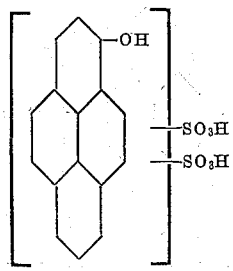

is separated from the mixture and after cooling it is filtered and washed with benzene, the yield being good. It is a feebly greenish yellow crystalline powder very soluble in water. Also sodium, calcium and lead salts which show strong fluorescence are freely soluble in water.

Example 5

48.8 parts of 2-hydroxychrysene are introduced whilst stirring into 480 parts of nitrobenzene; there are then added by drops at 8–10° C. and in the course of ¾ hour 24 parts of chloro-sulphonic acid. The stirring at the same temperature is continued for 3 hours and then for 16 hours at 18–20° C. The mixture is filtered from the greater part of the nitrobenzene, the rest being distilled in steam. There is thus produced a practically complete solution. For purification this is mixed with animal charcoal, boiled and filtered. By salting out the filtrate with sodium chloride a sodium-2-hydroxychrysene-mono-sulphonate of the formula

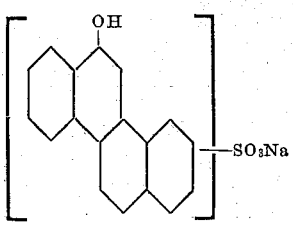

is precipitated in very good yield in the form of colorless crystals; it is filtered and may be recrystallized from water, colorless crystals being obtained.

By methylating the 2-hydroxychrysene-monosulphonic acid with dimethylsulphate the sodium-2-methoxychrysene sulphonate is obtained which may be converted into an acid chloride of melting point 200–202° C.

By melting the 2-hydroxychrysene-mono-sulphonic acid with caustic alkali a dihydroxychrysene is obtained which is very easily oxidizable and may be changed by boiling it with acetic anhydride into a diacetyl compound of melting point 243–244° C.; this may be regarded as 2,8-diacetyldihydroxychrysene.

Example 6

12.2 parts of 2-hydroxychrysene are mixed with 120 parts of tetrachlorethane and whilst stirring at 8–10° C. 5.2 parts of sulphuric acid monohydrate are dropped in in the course of ½ hour. The temperature is kept for 4 hours at 8–10° C., then raised to 18–20° C. and kept thereat for 16 hours. The mixture is then diluted with water and ice and the tetrachlorethane distilled in steam, whereby the 2-hydroxychrysene-mono-sulphonic acid passes into solution and may be separated by filtration from unchanged hydroxychrysene. By salting out the filtrate with common salt sodium-2-hydroxychrysene-monosulphonate is obtained in the form of a white crystalline powder which may be recrystallized from water. It couples with diazo-compounds. The 2-hydroxychrysene-mono-sulphonic acid obtained in this manner is presumably identical with the 2-hydroxychrysene-mono-sulphonic acid obtained as described in Example 5.

Example 7

8.6 parts of chloro-sulphonic acid are dropped into 45 parts of pyridine whilst stirring well at 20–30° C. After distilling the pyridine in a vacuum at 80–90° C. there are added 12.2 parts of hydroxychrysene and the mixture is stirred for 16 hours at 135–140° C. The mass is then transferred to water, made alkaline and the pyridine distilled with steam. The aqueous solution thus produced is filtered to separate small quantities of impurities, made acid to Congo with hydrochloric acid and boiled. In this manner some unattacked 2-hydroxychrysene is precipitated and may be removed by filtration. By salting out with common salt sodium-2-hydroxychrysene-mono-sulphonate is precipitated.

Example 8

60 parts of sodium-2-aminochrysene-mono-sulphonate made by mono-sulphonating 2-aminochrysene with sulphuric acid mono-hydrate are mixed with 700 parts of hydrochloric acid of 1 per cent. strength and stirred in an autoclave for 7 hours at 200–205° C. After cooling a little 2-hydroxychrysene is removed by filtration and the filtrate is salted out with common salt. After standing for some time the sodium-2-hydroxychrysene-mono-sulphonate precipitates in the form of a granular crystalline powder which is filtered and may be purified by recrystallization from water, it being thereby obtained in the form of colourless crystals which couple with diazo-compounds.

Example 9

61 parts of 2-hydroxychrysene are introduced into 600 parts of nitrobenzene and into the mixture at 8–10° C. and in the course of ¾ hour 60 parts of chloro-sulphonate acid are dropped. After stirring for 2 hours at 8–10° C. the temperature is raised in stages, being kept for 2 hours at 20–25° C. and for 2 hours at 50–60° C. The mixture is freed from most of the nitrobenzene by filtration, the residue being removed by steam distillation. The aqueous solution thus obtained is mixed with animal charcoal, filtered and the filtrate acidified with concentrated hydrochloric acid. The 2-hydroxychrysene-disulphonic acid of the formula

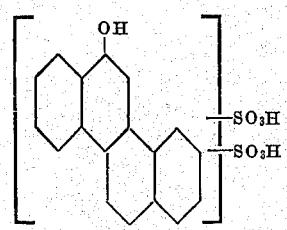

is thus precipitated in a very good yield in the form of a crystalline, nearly colorless powder which is filtered, washed with hydrochloric acid of 10 per cent. strength and dried. The 2-hydroxychrysene-disulphonic acid thus obtained is as freely soluble in water as its salts and couples with diazo-components.

*Example 10*

13.2 parts of 4-hydroxyfluoranthene of melting point 193° C. are mixed with 144 parts of nitrobenzene and at 8–10° C. 7.2 parts of chloro-sulphonic acid are dropped in whilst stirring and in the course of ½ hour. The temperature is kept for 3 hours at 8–10° C. and then for 16 hours at 18–21° C. The mass is now diluted with ice and water and the nitrobenzene is distilled in steam. A complete solution is thus formed. For purification this aqueous solution is mixed with animal charcoal, filtered hot and the filtrate mixed with common salt. The precipitated sodium-4-hydroxyfluoranthene-monosulphonate of the formula

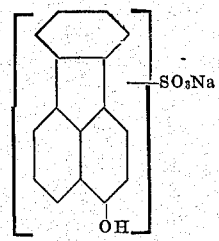

which is precipitated in very good yield is a light yellow crystalline powder which may be recrystallized from water in which it is only moderately soluble to a yellow solution having a green fluorescence.

*Example 11*

5.3 parts of 11-hydroxyfluoranthene of melting point 165° C. are dissolved in 60 parts of nitrobenzene and in the course of ½ hour while stirring and at 8–10° C. 3 parts of chloro-sulphonic acid are dropped into the solution. Stirring is continued for 3 hours at 8–10° C. and then for 16 hours at 18–21° C. The reaction is then complete. The nitrobenzene is removed by steam distillation. In this manner a solution is formed which is filtered and 11-hydroxyfluoranthene-monosulphonic acid of the formula

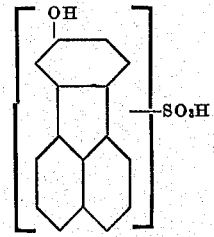

is salted out from it by means of common salt in good yield; for purification it may be recrystallized from water and is then a crystalline, feebly yellowish powder somewhat sparingly soluble in water.

*Example 12*

6.6 parts of 4-hydroxyfluoranthene of melting point 193° C. are mixed with 72 parts of nitrobenzene and in the course of ½ hour at 8–10° C. 7.2 parts of chlorosulphonic acid are dropped into the mixture while stirring. Stirring is continued for 2 hours at 8–10° C., for a further 2 hours at 20–25° C. and finally for 2 hours at 50–60° C. The mass is then filtered and from the residue the rest of the nitrobenzene is distilled by steam. For purification the solution thus procured is boiled with animal charcoal and filtered. From the filtrate a 4-hydroxyfluoranthene disulphonic acid is salted out with common salt in the form of a sodium salt. Enough sodium chloride should be added to produce a solution of 20 per cent. strength. The sodium-4-hydroxyfluoranthene-disulphonate of the formula

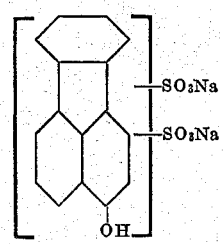

thus obtained is a feebly greenish crystalline powder which unlike the sodium-4-hydroxyfluoranthene-mono-sulphonate of Example 10 is freely soluble in water to a solution which shows green fluorescence; it can be recrystallized only from very concentrated solutions or from water containing common salt, whereby it may be obtained in the form of slender colorless needles.

What I claim is:

1. Angularly fused tetranuclear hydrocarbons containing besides hexa-carbon rings at most one penta-carbon ring and being free from methylene groups and which are substituted by one hydroxyl group as well as by one to two sulphonic acid groups.

2. Angularly fused tetranuclear hydrocarbons of the group consisting of pyrene and chrysene, which are substituted by a hydroxyl group as well as by one to two sulphonic acid groups.

3. Hydroxy-mono-sulphonic acids of angularly fused tetranuclear hydrocarbons containing besides hexa-carbon rings at most one penta-carbon ring and being free from methylene groups.

4. The hydroxy-chrysene-mono-sulphonic acid of the general formula

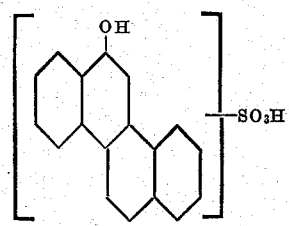

WALTER KERN.